June 25, 1963 V. ROMBOUTS 3,094,917
FILTERING DEVICE FOR THE PREPARATION OF
INFUSIONS, TO BE USED ONLY ONCE
Filed Feb. 23, 1960

INVENTOR
VICTOR ROMBOUTS

BY Richards & Geier
ATTORNEYS

United States Patent Office 3,094,917
Patented June 25, 1963

3,094,917
FILTERING DEVICE FOR THE PREPARATION OF INFUSIONS, TO BE USED ONLY ONCE
Victor Rombouts, Antwerp, Belgium, assignor to Koffie F. Rombouts N.V. in het Frans Cafes F. Rombouts S.A., Antwerp, Belgium
Filed Feb. 23, 1960, Ser. No. 10,441
Claims priority, application Belgium Nov. 17, 1959
1 Claim. (Cl. 99—287)

The present invention concerns the preparation of an infusion of aromatic substances in separate measured amounts, by means of devices which are made and designed for being used only once.

This problem mainly arises in the preparation of beverages and more especially coffee in separate measured amounts, principally for the benefit of a sound organisation and economy in refreshment rooms.

The main difficulty which is to be met in this respect consists in the fact that the device in question must not only be quite simple and of little weight, but that it must also be made in such way that it is practically impossible to use it a second time for the same purpose.

These conditions must be fulfilled without impairing in any way the normal flow of boiling liquid through the substance of which the infusion is to be made.

The present invention concerns a device which satisfies all these requirements and which moreover takes due account of the mechanical-physical phenomena which occur in the course of the filtering process. In consequence thereof, the device conforming to the present invention does not only fulfill the aforementioned conditions, but is also extremely easy to use. Similarly to the devices in common use, the device conforming to the present invention comprises a container with perforated bottom as well as a false bottom which is also perforated. According to the fundamentally new design on which the present invention is based, the connection between both bottoms is made in such way that aforesaid false bottom lies quite loose on the mass of substance of which an infusion is to be made, i.e. without exerting any pressure thereon, and this in such way that it can move away from aforesaid real bottom along appropriate guides, whereby this displacement is however accurately limited.

On account of this new feature concerning the positions of the real and of the false bottom with respect to each other, the result is obtained that the mass of which an infusion is to be made, is no longer contained in a space with constant volume as is the case with all conventional systems in use at this time, but is contained on the contrary in a space with variable volume, whereby the latter is however strictly limited to a certain maximum.

The remarkable fact about this new feature conforming to the present invention is that now, for the first time, due account is taken of the swelling which the infusing substance undergoes in the presence of the liquid medium, and this in such way that this swelling can no longer give rise to an internal pressure which tends to limit the flow of the liquid through the substance.

In the device conforming to the present invention, the substance is on the contrary, not subjected to any but an extremely slight pressure so that the liquid has no difficulty in flowing through.

On the other hand, the fact that the displacement possibility of the false bottom with respect to the real bottom affords a ready means for systematically preventing the device or any substance remaining therein after having already been extracted, from being used again, the design is such that it affords a sufficient safeguard against any attempt to remove the false bottom with the intention either of recuperating the exhausted substance or of using the device a second time.

The device conforming to the present invention affords extremely simple means for attaining aforesaid aim, which means consists therein that, between the real and the false bottom, small guiding elements are provided, made for instance of some thermoplastic substance, which after introduction of the substance and placement of the false bottom thereon, can be easily deformed, with the result that an assembly is obtained which can no longer be disassembled or otherwise tampered with.

All these characteristic features will appear more clearly from the following description of a convenient form of embodiment of the present invention, given merely by way of example and without implying any limitation, considering that numerous equivalent means can be used for attaining the same or a similar purpose. This particular form of embodiment is illustrated in the appended drawing in which.

Figure 1:
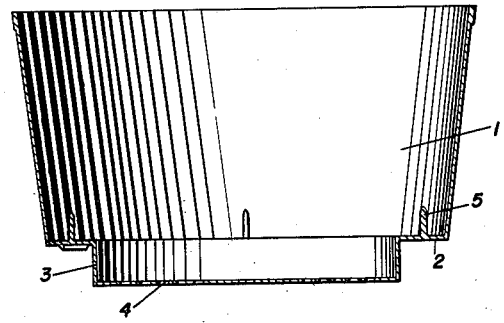
FIGURE 1 represents a radial section of the actual filtering bowl.
Figure 2:
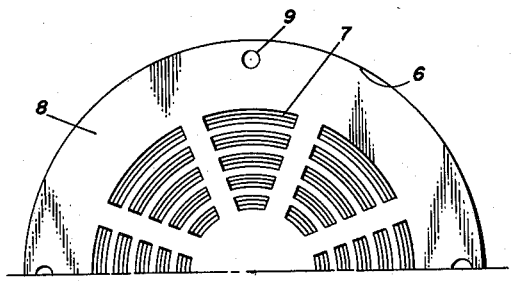
FIGURE 2 is a top view of one half of the perforated false bottom.
Figure 3:
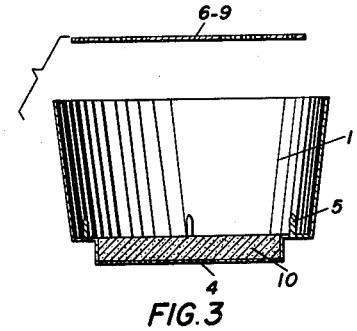
FIGURES 3, 4 and 5 show the relative positions of the false bottom and of the real bottom in three characteristic stages.
Figure 4:
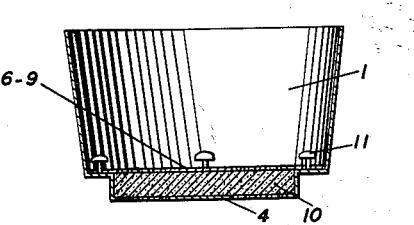
Figure 5:
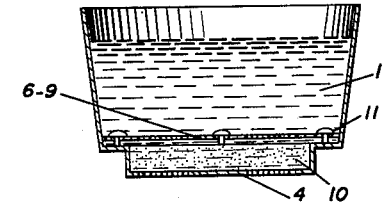

In the embodiment which is being described, the device consists of the actual filter bowl 1 of truncated conical shape, the bottom edge of which is provided with an inward ledge 2 extending into a cylindrical part 3 of smaller diameter, which part is closed below by the perforated bottom 4.

According to the present invention, the annular upper face of ledge 2 carries a certain number of small rods 5 which shall preferably be made integral with the whole of the thermoplastic bowl 1-4. The false bottom 6 consists of a thin perforated disc the diameter of which is smaller than the outer diameter of the annular ledge 2. The grooves 7 cover a surface which is somewhat smaller than that occupied by the perforations of the real bottom 4. Aforesaid false bottom 6 thus has a solid outer annular part 8 in which holes 9 are provided whose numbers and dimensions correspond to those of aforesaid rods 5 of the filter bowl.

Figure 6:
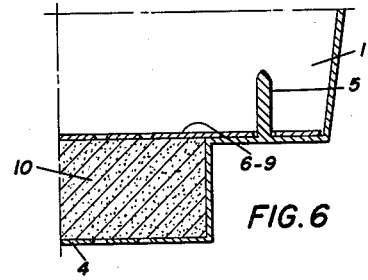
FIGURES 6, 7 and 8 are representations similar to those of FIGURES 3, 4 and 5 respectively, but on a larger scale.
Figure 7:
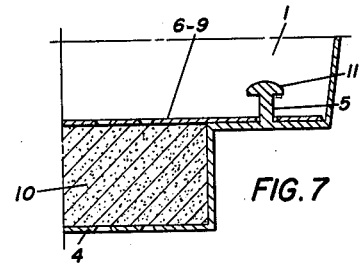
Figure 8:
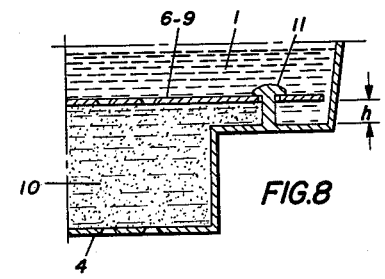

In order to make this device ready for use, the cylindrical part 3 of the filter bowl is first filled with the appropriate amount of the substance which is to be extracted, numbered 10 in the figure; the false bottom 6-9 is then placed in such way in the bowl 1 that the rods 5 of the latter project through the holes 9 as shown diagrammatically in FIGURE 6; finally, a pressure is exerted on aforesaid rods by means of an adequate tool heated to a temperature which is slightly above the softening point of the thermoplastic material, in order to soften the ends of the rods.

Thus, little heads 11 of mushroom shape are formed on the ends of the rods (see FIGURES 4 to 7).

It is obvious that aforesaid rods 5 now act as guides along which the false bottom 6-9 can move away from the real perforated bottom 4 of the bowl, this displacement being however limited by the mushroom-shaped heads 11.

The height $h$ over which the displacement is made possible, is determined in accordance with the normal increase in volume which the substance for extraction undergoes in the presence of the liquid medium. So, as soon as the liquid, such as boiling water say, is poured into the bowl 1 it reaches the substance 10 contained between the two bottoms thereof; this substance then swells and pushes the false bottom upward until the latter comes into contact with the mushroom-shaped heads 11. The result is that, although the substance for extraction remains enclosed in a limited space, it does not undergo any appreciable pressure, so that it offers but little resistance to the flow of liquid.

It is equally clear that when the whole of the liquid has seeped through the substance, the false bottom can not be removed, so that the device can not be used again.

The limitation of the upward movement of the false bottom can obviously be obtained by other means than those which have been described, for instance with the help of additional parts.

The present invention concerns the filtering device as such, as well as each of its constituent parts.

This invention is also particularly concerned with the manufacturing of all parts of the filter of one and the same thermoplastic material, the manufacturing process being designed for obtaining in the most economical and efficient way the means for guiding the perforated false bottom as well as the means for limiting its displacement.

What I claim is:

A single-use thermoplastic filtering device for the preparation of infusions, said device comprising a bowl having the shape of a truncated cone, an annular ledge integral with the end of the cone-shaped bowl having the smaller diameter, and a cylindrical member integral with said ledge and located outside of said bowl, said cylindrical member having a perforated fixed bottom and being of smaller diameter than said bowl, a perforated disc-shaped false bottom movably mounted upon said ledge adajcent said end of the bowl parallel to said fixed bottom, a plurality of pins circumferentially fixed upon said ledge and extending with play through holes formed in said false bottom, said pins being perpendicular to said bottoms, whereby said false bottom is guided by said pins for upward movement relatively to said fixed bottom, and mushroom-shaped heads upon the tops of said pins having sufficient length in order to permit a predetermined upward movement of the false bottom, the said upward movement being limited by the said mushroom-shaped heads of the said pins.

References Cited in the file of this patent
UNITED STATES PATENTS

| | | |
|---|---|---|
| 1,172,390 | Richheimer | Feb. 22, 1916 |
| 2,743,664 | Dale | May 1, 1956 |

FOREIGN PATENTS

| | | |
|---|---|---|
| 555,049 | Belgium | Aug. 16, 1957 |